3,321,444
PROCESS FOR THE MANUFACTURE OF HIGH MOLECULAR WEIGHT LINEAR POLYESTERS
Hans Hoyer, Frankfurt am Main, Günter Keil, Lorsbach, Taunus, and Peter Kresse, Augsburg, Germany, assignors to Farbwerke Hoechst Aktiengesellschaft vormals Meister Lucius & Brüning, Frankfurt am Main, Germany, a corporation of Germany
No Drawing. Filed Sept. 16, 1963, Ser. No. 309,336
Claims priority, application Germany, Sept. 22, 1962, F 37,865
3 Claims. (Cl. 260—75)

The present invention relates to a process for the manufacture of high molecular weight linear polyesters, it also relates to a process for the manufacture of high molecular weight fiber- and film-forming polyesters. More particularly, the present invention relates to a process for the manufacture of colorless, transparent polyesters.

In industry high molecular weight linear polyesters, especially polyethylene terephthalate have been gaining in importance as starting materials for the manufacture of fibers and foils. Polyesters of this kind can be produced by polycondensing dicarboxylic acids with dihydroxy compounds. In general, dialkyl esters of dicarboxylic acids are used which are subjected to an ester interchange reaction with dihydroxy compounds, mostly aliphatic diols. It is likewise possible, however, to react low esters of the diols, for example diacetates, with dicarboxylic acids. The products obtained in the ester interchange reaction are transformed into high molecular weight polyesters by heating with separation of volatile constituents.

Either reaction, i.e., the ester interchange reaction and the subsequent polycondensation take place with a satisfactory rate only in the presence of suitable catalysts. The known catalysts used are, in general, metal salts or oxides which accelerate in most cases the ester interchange reaction or the polycondensation. Known ester interchange catalysts are, for example, zinc acetate, calcium acetate or cobalt acetate. As polycondensation catalysts there have been proposed, for example, lead oxide, antimony trioxide or germanium dioxide.

In particular, the polycondensation catalyst often show a series of disadvantages impairing the properties of the polyesters made with their use. The disadvantages are, in the first place, too slow an acceleration of the polycondensation reaction. Since the polycondensation is accomplished at elevated temperature the heating period of the polyester melt is too long so that dark products are formed owing to thermal degradation. Moreover, with the time of condensation the amount of glycol ether formed by secondary reactions increases, reducing the melting point of the polyester. Still further, a number of catalysts, for example antimony trioxide, are insufficiently soluble in the reaction mixture. A further disadvantage of some known heavy metal catalysts, for example lead and antimony compounds, resides in the fact that during the reaction they are readily reduced to the metal stage. Thus, they lose their catalytic activity and color the polycondensation product. Such a reduction is observed especially when the condensation is carried out in the presence of trivalent phosphorus compounds, for example triphenyl phospite.

It has also been proposed to use as catalysts for the ester interchange reaction and/or the polycondensation complex compounds composed of aromatic radicals having at least two functional groups, bivalent cationically bound metal and anionically bound metal.

Titanium compounds are likewise known as catalysts. However, such compounds, for example titanic acid ortho ester, are very sensitive to hydrolysis and, therefore, they are difficult to handle, especially in small amounts. Others, for example titanium derivatives of organic dicarboxylic acids, must be prepared via the ortho esters. Moreover, all titanium compounds known as polyester catalysts do not have a high catalytic activity and in many cases they cause colorations.

It has now been found that the aforesaid disadvantages can be avoided and high molecular weight linear polyesters can be produced from dicarboxylic acids and dihydroxy compounds using as catalysts for the ester interchange reaction and/or the polycondensation metal-titanyl oxalates.

The proposed catalysts are complex compounds in which the complex anion consists of the titanyl radical and the oxalic acid radical. The cationic constituents may be alkali metal or alkaline earth metal ions, for example sodium, potassium, lithium, calcium, magnesium or barium ions, and the ions of heavy metals, for example the ions of zinc, tin, manganese, cadmium or antimony. The complex compounds used as catalysts are stable to hydrolysis and stable in air for an unlimited period of time.

The improvement of the catalytic activity of metal ions by complex formation is known art. The metal-titanyl oxalates synthesized according to this principle substantially accelerate the ester interchange reaction and the polycondensation. They are active already in a concentration in the range of 0.0001 to 0.05% by weight, calculated on the dicarboxylic acid ester used, and yield highly viscous polyesters after a short period of reaction. The polyesters obtained are substantially colorless and transparent in the molten state. A further advantage of the catalysts of the invention is that in the manufacture of polyethylene terephthalate, being the most important linear polyester in industry, with the use of the said catalysts the diglycol content of the polycondensation product is very low. It is possible to add phosphorus compounds, for example triphenyl phosphite, to the reaction mixture without reduction or an essential prolongation of the condensation time being observed. The catalysts of the invention can also be used in admixture with known catalysts, for example zinc acetate. The linear polyesters obtained by the process of the invention can be processed to yield limpid films capable of being stretched or fibers having a high degree of drawing.

The complex alkali metal titanyl oxalates are prepared in known manner by reacting freshly precipitated titanium dioxide hydrate with alkali metal hydrogen-oxalates. The complex alkaline earth metal titanyl oxalates and heavy metal titanyl oxalates are obtained by double reaction of alkali metal titanyl oxalates with water-soluble alkaline earth metal salts or heavy metal salts.

The catalysts of the invention accelerate the ester interchange reaction and the polycondensation of dicarboxylic acid dialkyl esters, for example methyl, ethyl, propyl, or butyl esters with organic dihydroxy compounds to yield high melecular weight polyesters. Dicarboxylic acids and dihydroxy compounds which can be used according to the invention for the manufacture of linear polyesters are, for example, terephthalic acid, isophthalic acid, 4,4-diphenyldicarboxylic acid, naphthalenedicarboxylic acids, sulfonyldibenzoic acid, adipic acid, sebacic acid, and the like; ethylene glycol and the homologs thereof as well as 1,4 - dimethylolcyclohexane. By the process according to the invention there may also be produced copolyesters from a plurality of dicarboxylic acids and/or a plurality of bifunctional hydroxyl compounds. An additional dicarboxylic acid is, for example, 5-sulfo-isophthalic acid.

The following examples serve to illustrate the invention but they are not intended to limit it thereto; the parts and percentages being by weight, calculated on the dimethyl terephthalate.

The relative viscosity of the products ($\eta_{rel}$) was dedetermined with 1% solutions of the polyesters in phenol/tetrachlorethane (3:2) at 25° C.

Example 1

In a stirring vessel provided with a distilling column heated at 65–75° C., 270 parts of dimethyl terephthalate and 216 parts of ethylene glycol were heated at 190–210° C. in the presence of 0.025% of zinc acetate until the methanol separation was complete. In a stirring vessel with descending condenser the precondensation product obtained, essentially consisting of terephthalic acid bis-($\beta$-hydroxyethyl) ester and ethylene glycol in excess, was subjected to polycondensation in the presence of 0.0005% of potassium titanyl oxalate. For this purpose, the mixture was first heated at atmospheric pressure and for one hour at 250° C. whereby the ethylene glycol (the amount in excess and the amount formed) was removed by distillation. Within one hour at 250° C. the pressure was then gradually reduced to 10 mm. of mercury, the mixture was kept for 1 hour under these conditions (10 mm. of mercury, 250° C.) and then for 30 minutes at 250° C. and under a pressure of 0.5 to 1 mm. of mercury. The polycondensation was terminated by heating the reaction mixture at 278° C. under a pressure of 0.5–1 mm. of mercury. The time required under these conditions (0.5–1 mm. of mercury, 278° C.) for obtaining a fiber-forming polycondensation product is referred to here and in the following examples as time of polycondensation. In the present case it was 45 minutes. A substantially colorless condensation product was obtained (remission 86.7%) having a relative viscosity of 1.91.

Example 2

A precondensation product obtained from 270 parts of dimethyl terephthalate and 216 parts of ethylene glycol in the presence of 0.025% zinc acetate was polycondensed as described in Example 1 with the aid of 0.001% of tin titanyl oxalate. After a time of polycondensation of 37 minutes a substantially colorless condensation product having a relative viscosity of 1.78 was obtained.

The tin titanyl oxalate used as catalyst was prepared as follows: A weakly acid solution of 6.4 grams of stannous chloride dihydrate in 50 cc. of water was dropped into a warm solution of 10.0 grams of potassium titanyl oxalate dihydrate in 50 cc. of water. The colorless precipitate formed was washed with acidified water, methanol and acetone and dried. 7.3 grams (65% of the theoretical yield) of colorless crystals of tin titanyl oxalate dihydrate were obtained.

Example 3

450 parts of dimethyl terephthalate and 432 parts of ethylene glycol were subjected to an ester interchange reaction in the presence of 0.02% of zinc acetate and polycondensed as described in Example 1 with the addition of 0.01% of calcium titanyl oxalate. After a time of polycondensation of 60 minutes a substantially colorless polyester was obtained having a relative viscosity of 1.935 and a softening point of 259° C. The threads spun from the polyester had a strength of 5.2 grams/denier with an elongation of 30.9%.

Example 4

450 parts of dimethyl terephthalate and 432 parts of ethylene glycol were subjected to an ester interchange reaction in the presence of 0.02% of zinc acetate as described in Example 1. The polycondensation was carried out in the presence of 0.005% of zinc titanyl oxalate.

After 60 minutes a transparent colorless condensation product was obtained having a relative viscosity of 1.674 and a softening point of 260° C.

Example 5

250 parts of dimethyl terephthalate, 8 parts of the sodium salt of 5-sulfo-isophthalic acid and 176 parts of ethylene glycol were subjected to an ester interchange reaction in the presence of 0.025% of zinc acetate until the separation of methanol was complete. The precondensation product obtained was polycondensed as described in Example 1 with the aid of 0.0005% of potassium titanyl oxalate. After a time of polycondensation of 48 minutes a substantially colorless polycondensation product was obtained having a relative viscosity of 1.74 and an improved affinity for basic dyestuffs and dispersion dyestuffs.

Example 6

500 parts of dimethyl terephthalate and 415 parts of ethylene glycol were subjected to an ester interchange reaction in the presence of 0.025% of zinc acetate. The precondensation product obtained was transferred to a stirring autoclave made of stainless steel and provided with descending condenser. 0.4% of titanium dioxide in the form of a suspension in ethylene glycol and 0.0024% of potassium titanyl oxalate were added. The mixture was polycondensed under the pressure/temperature conditions as described in Example 1 with a stirring speed of 50 revolutions per minute. After a time of condensation of 100 minutes a substantially colorless polycondensation product having a relative viscosity of 1.94 was obtained.

Example 7

500 parts of dimethyl terephthalate and 415 parts of ethylene glycol were subjected to an ester interchange reaction in the presence of 0.025% of zinc acetate until the separation of methanol was terminated. The reaction mixture was transferred to a stirring autoclave of stainless steel. A suspension of 0.4% of titanium dioxide in ethylene glycol, 0.018% of triphenyl phosphite and 0.0024% of potassium titanyl oxalate were added and the polycondensation was carried out under the pressure/temperature conditions specified in Example 1. After a time of polycondensation of 95 minutes a condensation product was obtained having a relative viscosity of 1.70 and a higher degree of whiteness than the product of Example 6.

We claim:

1. A process for the manufacture of high molecular weight linear polyesters by ester interchange reaction of dialkyl esters of dicarboxylic acids selected from the group consisting of terephthalic acid, isophthalic acid, 4,4' - diphenyldicarboxylic acid, naphthalenedicarboxylic acids, sulfonyldibenzoic acid, adipic acid, and sebacic acid, with dihydroxy compounds selected from the group consisting of ethylene glycol, propylene glycol, butylene glycol, pentylene glycol and 1,4-dimethylolcyclohexane, and subsequent polycondensation at a temperature in the range of from 250 to 278° C. under reduced pressure, which comprises using as a catalyst for the polycondensation a metal titanyl oxalate containing as cationically bound constituents a metal selected from the group consisting of alkali metals, alkaline earth metals, antimony, tin, zinc, lead, manganese, cobalt and cadmium.

2. The process of claim 1, which comprises using 0.0001 to 0.05% of metal titanyl oxalate, calculated on the dicarboxylic acid ester used.

3. A process for the manufacture of high molecular weight linear copolyesters by ester interchange of dimethyl terephthalate and 5-sulfoisophthalic acid dimethyl ester with ethylene glycol and subsequent polycondensation at a temperature in the range of from 250° C. to 278° C. under reduced pressure, which comprises using as a catalyst for the polycondensation a metal titanyl oxalate containing as cationically bound constituent a metal selected from the group consisting of alkali metals, alkaline earth metals, antimony, tin, zinc, lead, manganese, cobalt and cadmium.

References Cited by the Examiner

UNITED STATES PATENTS

| | | | |
|---|---|---|---|
| 2,916,474 | 12/1959 | Engle | 260—75 |
| 3,047,515 | 7/1962 | Piirma | 260—75 |
| 3,231,328 | 1/1966 | Pechini | 260—429.5 |

WILLIAM H. SHORT, *Primary Examiner.*

LOUISE P. QUAST, *Examiner.*